Patented Jan. 11, 1949

2,458,944

UNITED STATES PATENT OFFICE 2,458,944

ORGANO-SILOXANES AND METHOD OF MAKING THEM

James Franklin Hyde, Corning, N. Y., assignor to Corning Glass Works, Corning, N. Y., a corporation of New York No Drawing. Application March 20, 1944, Serial No. 527,349

6 Claims. (Cl. 260—46.5)

This invention relates to new compositions of matter and their preparation and, more particularly, to organo-siloxanes and methods of preparing them.

This application is a continuation-in-part of my copending applications Serial Number 432,528 filed February 26, 1942, Serial Number 467,146 filed November 27, 1942 and Serial Number 483,450, filed April 17, 1943, now abandoned, all assigned to the assignee of the present invention.

The hydrolysis of a mono-silane of the type $SiX_4$, where X is a hydrolyzable radical, such as halogen, alkoxy, aroxy, acyloxy, hydrogen, etc., does not result in a simple hydroxy compound but produces instead a brittle, insoluble, infusible siliceous solid comprising a three-dimensional network of structural units composed of siloxane linkages as a result of the concurrent or subsequent loss of water from the intermediately formed hydroxy compound.

Type I

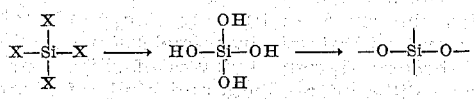

The formation of a siloxane linkage generally results from the close approach of two hydroxyl groups and subsequent elimination of water. It may also result from the close approach of one hydroxyl group to a hydrolyzable group such as halogen, acyloxy or alkoxy and subsequent elimination of hydrogen halide, carboxylic acid or alcohol, respectively. Such eliminations are catalyzed by mineral acids, especially hydrochloric and sulphuric and by alkali metal hydroxides, especially sodium hydroxide. It is apparent that, in the formation of such a rigid structure, many hydroxyl groups become isolated and block some of the possible cross-linkages. As the structural network becomes more complicated, dehydration becomes increasingly more difficult, and the result is a partially dehydrated siliceous mass of poor dimensional stability.

Organo-substituted silanes of the type $RR'SiY_2$ are prepared by means of the well-known Grignard reaction, where R and R' may be any organic radical which is capable of reacting with magnesium to form a Grignard reagent and which is attached to silicon through a carbon atom, and where each Y is a hydrolyzable radical such as hydrogen, halogens, alkoxy, aroxy, acyloxy, etc. By hydrolyzable radical is meant, in general, any radical which is attached to silicon by other than carbon-silicon linkage and which under the same set of conditions is more readily hydrolyzed than an organic radical directly attached to silicon through carbon-silicon linkage.

Type II

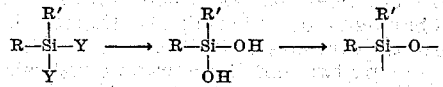

In each structural unit two of the four silicon bonds are now blocked by the organic radicals R and R', and only two siloxane linkages are possible. Hence, a three-dimensional network is no longer possible and the resulting organo-siloxanes can comprise only chain and cyclic structures. Intermediate crystalline dihydroxy compounds can in some instances be isolated. The final products which are usually resinous in character bear little physical resemblance to silicic acids but are closely related thereto in chemical structure, differing only in the restriction of possible siloxane linkages to two dimensions instead of three.

Organo-substituted silanes of the type $R''R'''R''''SiZ$ may also be prepared by the Grignard reaction where R'', R''' and R'''' are organic radicals which are capable of reacting with magnesium to form a Grignard reagent, and which are not necessarily the same, and where Z is a hydrolyzable radical such as X and Y defined above. When these silanes are hydrolyzed and dehydrated, they yield simple oxides in the structural unit of which three of the four silicon bonds are blocked by the organic radicals R'', R''' and R''''.

Type III

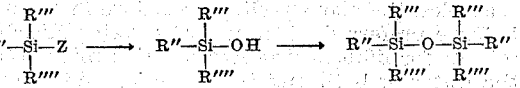

In this case, ease of hydrolysis is further diminished and in some cases the intermediate hydroxy silanes can be isolated. The completely dehydrated product is dimeric because only one siloxane linkage can be formed. The dimers are either crystalline or liquid.

Prior attempts to utilize the above-described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible gel of little utility; Type III reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object is to combine the above-described reactions and thus to inter-condense the hydrolysis products of at least one non-organo-substituted mono-silane, at least one di-organo-substituted mono-silane and at least one tri-organo-substituted mono-silane.

Another object is to produce liquid products of varying viscosity.

Another object is to produce thermoplastic resinous products.

Another object is to produce thermosetting resinous products.

A further object of the present invention is to prepare organo-siloxanes which contain silicon atoms having no organic radicals attached thereto through carbon-silicon linkages, and silicon atoms having two and three organic radicals respectively attached thereto through carbon-silicon linkages.

The new method comprises mixing together at least one compound of each of the types $SiX_4$, $RR'SiY_2$, and $R''R'''R''''SiZ$, where R, R', R'', R''', and R'''' are the same or different organic radicals attached to silicon through carbon-silicon linkages and where X, Y, and Z are the same or different hydrolyzable radicals attached to silicon by other than carbon-silicon linkages, and causing them to hydrolyze together and to become inter-condensed. It is to be understood that each of the silanes is present in appreciable quantity, i. e., in amount sufficient to produce a perceptible effect on the properties of the resulting inter-condensate. One method of accomplishing inter-condensation is by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds, and a variation in the amounts present in the initial mixture, may make it desirable to vary the conditions of the process, as will appear from a consideration of the accompanying examples, the above recited procedure in general is to be preferred. The use of a water-miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

Hydrolyis and dehydration of the above mixture of mono-silanes result in inter-condensation or formation of inter-connecting oxygen linkages between the silicon atoms of the various silanes. The variety of the substituted organic radicals is limited only by their ability to form a Grignard reagent. The radicals which may thus be substituted may include alkyl radicals such as methyl, ethyl, propyl isopropyl, butyl, isobutyl, amyl, hexyl, heptyl to octadecyl and higher; alicyclic radicals such as cyclopentyl, cyclohexyl, etc., aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls, as methyl naphthyl, diethyl naphthyl, tri-propyl naphthyl, etc.; tetra-hydro-naphthyl; anthracyl, etc.; aralkyl such as benzyl, phenyl-ethyl, etc.; alkenyl such as methallyl, allyl, etc. The above radicals may contain inorganic substituents such as halogens, etc.

If the hydrolyzable group or groups of all of the silanes in the mixture to be hydrolyzed are halogens, it is preferable to employ dioxan as the solvent because it is inert to the halogens. If the mixture contains both halogens and alkoxy groups, the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above described method, the slow incorporation of water into the homogeneous solution insures that hydrolysis is not permitted to proceed unchecked, whereby the more reactive silane or silanes would be more completely hydrolyzed and condensed before the less reactive have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The partially dehydrated organo-siloxanes or hydrolysis products, after removal of solvents, are generally liquids of various viscosities and they vary in the extent to which dehydration has occurred at this stage. The ease of dehydration and the physical properties of the completely condensed organo-siloxanes vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio decreases. When this ratio is less than one, the organo-siloxanes are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, the viscosity increases to such an extent that the organo-siloxanes are thermoplastic solids which may be fused and solidified repeatedly by heating and cooling. As the oxygen to silicon ratio is increased to the neighborhood of 1.5 and beyond (approaching 2), the organo-siloxanes tend to become thermosetting and more particularly if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of an organo-siloxane for the desired purpose.

The organo-siloxanes which are produced by my method may be represented as combinations of the units

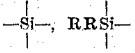

and R'' R''' R'''' Si— bearing in mind that these units are chemically combined with each other by siloxane linkages, that the percentage of each unit may be varied at will, and that the properties of the resulting products will show corresponding variations which can be predicted in making compositions for a particular purpose. It is also to be understood that the units may be joined in a multiplicity of ways to form chain and cyclic structures and combinations thereof. Also, the organic radical or radicals in each structural unit may be varied in kind.

The following examples will illustrate the mode of operation of the process and the character of the resulting products.

*Example 1*

Ethylorthosilicate, dimethyldiethoxysilane and tribenzylsilicon chloride were mixed in the mol ratio 3/3/1 and three volumes of dioxane were added. Solution was complete when the mixture was warmed. 0.5% HCl diluted with dioxane was added dropwise. The solution was concentrated to leave a tacky solid, which was thermoplastic, but which set in one hour at 180° C.

*Example 2*

A mixture of $Si(OC_2H_5)_4$, 19.7 grams (.09 mol), $(C_6H_5)_2SiCl_2$, 24.48 (.09 mol), and $(CH_3)_3Si(OC_2H_5)$, 3.5 grams (.03 mol) was prepared. The mixture was stirred and treated dropwise with 5.13 grams of water over a period of 45 minutes to bring about hydrolysis. After adding the above amount of water (which is that theoretically required for complete hydrolysis), another gram of water was added and the reaction mixture allowed to stand overnight. After again stirring the reaction mixture for a few minutes, it was heated to boiling for 5–10 minutes and then washed to neutrality using diethyl ether as a solvent. The solvent and residual water were then removed under vacuum with warming, leaving an extremely viscous, tacky liquid weighing 26.67 grams. It was very fluid at 190° and after 3½ hours at that temperature it had become slightly more viscous. At room temperature it was non-tacky though still plastic. Heating for three hours at 250° C. caused the product to set to a resinous solid.

*Example 3*

A mixture of 20.4 grams of $SiCl_4$ (0.12 mol), 24.6 grams of $(C_6H_5)(C_2H_5)SiCl_2$ (0.12 mol) and 6.02 grams of $(C_2H_5)_3SiCl$ (.04 mol) was prepared. On adding the first drops of water with stirring slight precipitation occurred, so the mixture was diluted with 40 cc. of dioxan. The water to be added was also diluted with 20 cc. of dioxan. Hydrolysis of the halide mixture was then carried out by adding the dioxan-water mixture (containing 6.84 grams of water) to the halide mixture over a period of 6 hours. Some further precipitation of silica occurred amounting in toto to 4 grams. The silica equivalent of the initial $SiCl_4$ was 7.2 grams. An oily liquid was obtained which when washed and dried had a viscosity of 11,780 centistokes. When the product was heated at 190° C. for 3 hours there was very little viscosity increase but after 18 hours at 250° it had set to a hard and tough resinous solid.

*Example 4*

Ethylorthosilicate, dimethyldiethoxysilane and trimethylethoxysilane were mixed in the molar ratio of 5/1/4 respectively. The mixture was hydrolyzed by addition of excess water with a trace of hydrochloric acid present as a hydrolysis catalyst. The solvent and residual water were removed by warming under vacuum, leaving a viscous fluid which became a thermoplastic solid after a few hours at 190° C.

As has been pointed out, it is possible to predict the general properties of the inter-condensates on the basis of the oxygen/silicon ratio and the secondary effect of the size of the organic radicals. However, in all organo-silicon compounds the thermal stability of the carbon-silicon linkage varies with the kind of radical. It is necessary to take this into account when considering uses for organo-siloxanes. In general, there is a decrease in thermal stability with increase in size of aliphatic radicals. This is clearly shown by comparison of the thermal behavior of organo-siloxanes containing methyl radicals with those containing dodecyl radicals. The compositions containing allyl, methallyl, benzyl and β-phenylethyl radicals, are relatively less stable than compositions containing such radicals as phenyl, methyl, ethyl, etc. Therefore, certain temperature limitations are encountered in their uses.

It will be seen that the inter-condensates produced by my method are not mixtures of individual organo-siloxanes but are new compounds differing therefrom in homogeneity of structure and properties. It will further be seen that the new organo-siloxanes may contain various different radicals attached to the same silicon atom and the individual silicon atoms may differ in the number and kind of radicals attached thereto in which respect the new siloxanes differ from previous siloxanes where each silicon atom was attached to the same kind of radicals. Such differences result in new compounds or inter-condensates which embody various improvements over previous organo-siloxanes with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

I claim:

1. An organo-siloxane consisting essentially of oxygen atoms and units which correspond substantially to the general formulae $=Si=$, $RR'Si=$ and $R''R'''R''''Si-$, respectively, said units being the only silicon units present in said siloxane and being joined to each other by said oxygen atoms through silicon-oxygen linkages, where $R$, $R'$, $R''$, $R'''$ and $R''''$ are mono-valent hydrocarbon radicals which are attached to silicon through carbon-silicon linkages and where the remaining valences of the silicon atoms are satisfied by said silicon-oxygen linkages.

2. An organo-siloxane consisting essentially of oxygen atoms and units which correspond substantially to the general formulae $=Si=$, $RR'Si=$ and $R''R'''R''''Si-$, respectively, said units being the only silicon units present in said siloxane and being joined together by said oxygen atoms through silicon-oxygen linkages, where $R$, $R'$, $R''$, $R'''$ and $R''''$ are lower alkyl radicals which are attached to silicon through carbon-silicon linkages and where the remaining valences of the silicon atoms are satisfied by said silicon-oxygen linkages.

3. An organo-siloxane consisting essentially of oxygen atoms and units which correspond substantially to the general formulae $=Si=$, $RR'Si=$, and $R''R'''R''''Si-$, respectively, said units being the only silicon units present in said siloxane and being joined together by said oxygen atoms through silicon-oxygen linkages, where some of the R's are lower alkyl radicals and the rest are phenyl radicals, said radicals being attached to silicon through carbon-silicon linkages and where the remaining valences of the silicon atoms are satisfied by said silicon-oxygen linkages.

4. An organo-siloxane consisting essentially of oxygen atoms and units which correspond substantially to the general formulae $=Si=$, $(CH_3)_2Si=$ and $(CH_3)_3Si-$, respectively, said units being the only silicon units present in said siloxane and being joined to each other by oxygen atoms through silicon-oxygen linkages and the remaining valences of the silicon atoms being satisfied by said silicon-oxygen linkages.

5. An organo-siloxane consisting essentially of oxygen atoms and units which correspond substantially to the formulae $=Si=$, $(C_6H_5)_2Si=$ and $(CH_3)_3Si-$, respectively, said units being the only silicon units present in said siloxane and being joined to each other by said oxygen atoms through silicon-oxygen linkages and the remaining valences of the silicon atoms being satisfied by said silicon-oxygen linkages.

6. An organo-siloxane consisting essentially of oxygen atoms and units which correspond substantially to the formulae $=Si=$, $(C_6H_5)(C_2H_5)Si=$ and $(C_2H_5)_3Si-$, respectively, said units being the only silicon units present in said siloxane and being joined to each other by said oxygen atoms through silicon-oxygen linkages and the remaining valences of the silicon atoms being satified by said silicon-oxygen linkages.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,068 | Rochow | Mar. 6, 1945 |

OTHER REFERENCES

Meads et al.: Trans. Journal of the Chemical Soc. (London), vol. 105, 1914, pp. 679 to 690.

Rochow: Chemistry of the Silicones, Wiley, 1946, pp. 93 and 94.

Cusa et al.: J. Chem. Soc. (London), 1932, pp. 2205 to 2209.